United States Patent [19] [11] 3,875,308
Kato et al. [45] Apr. 1, 1975

[54] FOOD COMPOSITIONS CONTAINING PULLULAN

[75] Inventors: Koso Kato; Makota Shiosaka, both of Okayama, Japan

[73] Assignee: Hayashibara Biochemical Laboratories, Incorporated, Okayama, Japan

[22] Filed: Jan. 2, 1973

[21] Appl. No.: 319,996

[30] Foreign Application Priority Data
Jan. 13, 1972 Japan.................................. 47-5580

[52] U.S. Cl................. 426/152, 426/164, 426/190, 426/158, 426/804
[51] Int. Cl............................................. A21d 13/06
[58] Field of Search ........... 426/158, 163, 164, 190, 426/213, 214, 103, 152; 195/31 P; 260/209 R

[56] References Cited
UNITED STATES PATENTS
2,916,383  12/1959  Nasarevich et al. ............ 426/213 X
3,023,104  2/1962  Battista........................... 426/214 X
3,320,136  5/1967  Zajic................................ 195/31 P
3,406,114  10/1968  Goren.............................. 195/31 P FOREIGN PATENTS OR APPLICATIONS
1,096,850  1/1961  Germany.......................... 195/31 P

OTHER PUBLICATIONS

Jeanes, "Northern Regional Research Laboratory" Peoria, Illinois 1966, page 21.

Primary Examiner—Raymond N. Jones
Attorney, Agent, or Firm—Hans Berman; Kurt Kelman

[57] ABSTRACT

Pullulan, a polysaccharide consisting of maltotriose units linked by $\alpha$-1, 6-glucosidic bonds is utilized to replace starch in solid and liquid food so as to reduce the caloric value of food.

5 Claims, No Drawings

FOOD COMPOSITIONS CONTAINING PULLULAN

This invention relates to solid and liquid food low in caloric value, and particularly to food in which starch is at least partly replaced by pullulan and to methods of preparing such food.

Pullulan is a known polysaccharide consisting of maltotriose units linked by α-1,6-glucosidic bonds. Maltotriose consists of glucose units. Pullulan is produced extracellularly in large amounts within 3 to 8 days by submerged cultures of *Pullularia pullulans* under aerobic conditions from sucrose or starch hydrolyzate as a carbon source in the presence of conventional nitrogen sources and inorganic salts (H. Bender et al.: Biochim. Biophys. Acta 36 [1959] 309; S. Ueda: Kogyokagakushi 67 [1964] 757-760). The pullulan may be precipitated from the cell-free culture broth by adding methanol. It may be purified by treating its aqueous solutions with active carbon, and again precipitated from the filtered aqueous solution by methanol. The purified pullulan is a white powder of bland taste and odor which is edible, but not of significant nutritive value.

It readily dissolves in water to form solutions whose viscosity is high and a function of the degree of polymerization of the pullulan which may vary approximately between 100 and 5,000, depending on the specific strain of *P. pullulans* employed and the culturing period.

It has now been found that pullulan may be incorporated in solid and liquid food to replace starch, imparting to the food the characteristics normally derived from starch such as consistency, also referred to as texture or viscosity, dispersibility, moisture retention, and the ability of satisfying the appetite, but differing from starch in that it is not absorbed by the walls of the intestinal tract and is converted to digestible saccharides by the enzymes present in the intestine only to an insignificant extent. Pullulan, in effect, reduces the caloric value of foods by the nutritive value of the replaced starch, yet satisfies the appetite as does an approximately equal weight of starch.

Pullulan improves the shelf life of food because it is not a readily assimilable carbon source for the bacteria, molds and fungi largely responsible for the spoilage of food and capable of growing on starch. Pullulan is superior to starch in its water retention, and thus retards spoilage of food by drying out. It is not subject to retrogradation characteristic of starch. Food compositions containing pullulan are superior in taste and consistency to those prepared from crystalline, waterinsoluble cellulose derivatives disclosed in U.S. Pat. No. 3,023,104.

The resistance of pullulan to digestive enzymes is illustrated by the following tests in which 1 ml samples of various amylase solutions, 2 ml of a 1% pullulan solution, and 7 ml buffer solution were mixed, and the mixtures were incubated at 37°C.

The four enzyme solutions tested were produced from the small intestine, the pancreas, and the liver of pigs, and from human saliva. The amount of reducing sugar was determined in each mixture after 3 hours and in most instances again after 22 hours of incubation by the method of Somogyi-Nelson. Duplicate tests were run.

The intestinal amylase, at pH 6.8, produced 0 to 0.088 mg reducing sugar from 20 mg pullulan in 3 hours, 0.72 and 0.51 mg in 22 hours. The corresponding values for pancreas amylase at pH 5.0 were 0.46 and 1.52 mg after 3 hours, 0.90 mg after 22 hours. The liver enzyme at pH 6.8 produced 0.72 mg reducing sugar in two runs after 3 hours. α-Amylase from human saliva at pH 6.0 gave two identical readings of 0.48 mg after 3 hours, and 2.33 mg and 2.5 mg after 22 hours.

As is evident from these results, pullulan is highly resistant to the enzymes that could attack it in the intestinal tract. These findings were confirmed by the fact that the blood sugar level of fasting rabbits was not significantly increased after oral administration of pullulan. When an aqueous 50% solution of pullulan was injected into the small intestine of fasting rabbits, and both ends of the intestine were ligated, 97% of the injected pullulan was still found in the ligated intestine after three hours.

The lack of nutritive value of pullulan was further established in rats initially weighing about 50 g each. A control group of 10 rats was fed a solid diet consisting of 65% corn starch, 21% casein, 7% soybean oil, 1% mixed vitamins, 2% salts, and 4% cellulose. A second group of 20 rats received the same amounts of a diet in which 20% of the corn starch (based on the combined weight of all ingredients) was replaced by pullulan, and a third group received an otherwise identical diet containing 25% corn starch and 40% pullulan.

The rats of the control group showed an approximately linear increase in body weight to 150 g in 30 days. The weight increase in the second group was one half that of the control group, and the weight increase of the third group was one third of that observed in the control group. None of the rats receiving pullulan in their diet developed diarrhea or other symptoms of harmful effects of the diet other than those due to low caloric intake.

Pullulan thus may replace starch or flour partly or entirely in solid and liquid food where the nutrient value of the food is to be reduced for the control of human weight, in diets for diabetics, and in similar applications. It is tasteless and imparts to baked goods a texture or consistency frequently superior to that of the same goods prepared from flour, and longer shelf life due to better water retention and retarded microbial spoilage, the baked goods being sometimes in salable conditions 3 to 7 days longer than the same goods prepared from flour.

In liquid foods, such as fruit juices and sauces, pullulan may completely replace corn starch as a thickener. It also acts as a dispersant which prevents turbidity and formation of precipitates in drinks and disperses fat and protein in sauces and the like. To achieve such results, the aqueous fluid food material should contain at least 0.05 percent by weight of pullulan having a degree of polymerization of 5,000, and correspondingly more of pullulan having a lower D.P. In solid foods it may be mixed with flour or starch in a ratio of 1 part pullulan to 0.5 to 5 parts flour or starch, but some experimentation may be necessary to establish optimum mixing ratios not only for imparting desirable properties to the product, but also convenient processing characteristics to the raw and semi-cooked food composition. The degree of polymerization (D.P.) of the pullulan employed is often relatively unimportant, and differences in D.P. in different batches of pullulan may be compensated for by minor changes in the amount of pullulan used. Where high viscosity of a food composition interferes with processing, pullulan of high D.P. should be avoided.

Maltitol, a sugar alcohol of strongly sweet taste and minimal caloric value, may be combined to advantage with pullulan in liquid foods as a substitute for sucrose. Milk, fruit juices, coffee, cola drinks and other carbonated beverages, and lactic acid drinks may be modified by the use of pullulan alone or with maltitol to reduce their nutritive value without loss of eating quality, which is that of the food material in the composition.

The following Examples of liquid and solid food composition in which pullulan replaces starch or flour, but which are otherwise conventional, further illustrate this invention. All numerical values of parts and percentages are by weight, unless specifically stated otherwise. The pullulan employed in the Examples had an average D.P. of 100 to 4,000. The term "degree of polymerization" (D.P.), as employed in this application, indicates the number of glucose units in the molecule of pullulan.

EXMAPLE 1

An orange drink was prepared from 1 liter natural orange juice, 5 g pullulan (D.P. 4,000) powder, 400 ml aqueous 50% maltitol solution, and enough water to make 2 liters. The pullulan was added gradually to the orange juice and dissolved by vigorous stirring, and the other ingredients were mixed with the solution so obtained.

The drink had the body or consistency of undiluted orange juice and a taste of sweet oranges without an aftertaste characteristic of many artificial food ingredients. Its caloric value was 50% of that of orange juice.

EXAMPLE 2

One hundred g Flour and 100 g pullulan (D.P. 300) powder were mixed, and the mixture was sifted. 50 g Sugar were creamed with 70 g butter, and small amounts of salt and vanilla, one beaten egg (about 50g), and 50 g aqueous 70% maltitol solution were mixed in this order. The mixture of flour and pullulan was added in small batches to prepare a dough which was kneaded gently and formed into a ball. The latter was rolled into a sheet, 3 – 5 mm thick, between two sheets of cloths dusted with dry flour. A cookie cutter was employed for shaping pieces of the dough sheet, and the pieces were placed on baking sheets and placed in an oven until their edges turned brown in about 10 minutes.

The carbohydrate content of the cookies was only one-half of similar cookies prepared from conventional materials. Their taste and texture compared favorably with the conventional product.

EXAMPLE 3

A fried bakery product was prepared from 500 g confectionary sugar, 890 g 70% maltitol solution, 1,900 g flour, 1,900 g pullulan (D.P. 100), 65 g ammonium carbonate, 45 g bakery yeast and 1,500 g lukewarm water (27°C).

The yeast was dissolved in the water, and the solution was placed in a kneader together with the sugar, the maltitol solution, and the ammonium carbonate. The flour and pullulan were mixed and sifted and gradually added to the kneader to make a dough. The dough was permitted to ferment for 3 hours in warm place and then spread out into a sheet about 5 mm thick. The sheet was cut into sticks 5 mm wide and 50 mm long, and the sticks were sprinkled with flour and placed in wooden boxes for further fermentation which caused them to become round. They were then fried in deep oil until uniformly brown, scooped from the oil with a wire ladle, drained, dried, and coated with a syrup prepared by partial evaporation of molasses.

The sticks so obtained were crisp and of pleasing texture. They were low in calories as compared to the conventional product prepared from flour only.

EXAMPLE 4

A traditional European cake known as Baumkuchen or Bucher de Noel was prepared from 1,400 g butter, 600 g sugar, 1,400 g 70% maltitol solution, 3,700 g eggs, 350 g flour, 700 g pullulan (D.P. 100), 300 g corn starch, 5 g artificial flavoring, 2 g nutmeg, one fresh lemon, 100 g honey, 200 ml heavy cream, and 100 ml rum.

A portion of the sugar was creamed with the butter and the aqueous maltitol solution was added with steady stirring in a mixer. The egg yolks were added next in three batches and stirring continued until a homogeneous creamy mixture was formed to which the honey, rum, and a portion of the cream were added. Thereafter, one third of the egg whites beaten separately with the remainder of the sugar was mixed in, and last in intimate mixture of the flour, pullulan, nutmeg, and corn starch together with the remainder of the whipped egg white.

The cake mix so prepared was baked. The cake retained its moisture content and fresh taste for a longer period than a comparison product prepared with flour instead of the pullulan and additional sugar instead of the maltitol.

EXAMPLE 5

An aqueous ice cream mix was prepared to contain 12% butter fat, 10% skim milk solids, and 15% sucrose. The mix was heated to 70°C whereupon 0.25% pullulan (D.P. 300) were stirred in, and a temperature of 70° was maintained for about 30 minutes. The mix was then homogenized and passed over a surface cooler held at about 10°C. The cooled mix was whipped to 100% overrun and frozen until solidified in the usual manner.

Storage tests showed that the ice cream did not shrink significantly and that ice crystals did not form. The pullulan acted as an effective stabilizer.

EXAMPLE 6

Three batches of bread dough were prepared from 100 parts flour and pullulan (D.P. 100), 2 parts yeast, 0.1 part salt, and 60 parts water. The pullulan in the three batches amounted to 20%, 30%, and 45% of the flour respectively, and the flour and pullulan were well mixed before they were made into the dough. The three batches of dough were permitted to ferment at 20°C for 2 hours and baked for 40 minutes.

The pullulan content made the dough somewhat more viscous during kneading, but the breads had a fine, smooth interior and a good, well-colored crust. The bread containing 30% pullulan was softest. That containing 45% pullulan did not sufficiently expand and was slightly hard. All breads had good flavor and taste, and uncommonly long shelf life.

EXAMPLE 7

Flour of the type used for Chinese noodles was mixed with pullulan (D.P. 500) at a ratio of 3:1. A dough was prepared by adding to 25 kg of the mixture 0.35 kg salt, 0.035 kg Kansui (dry alkali metal carbonates), yellow artificial coloring, and 8.0 kg water, and kneading the mixture. The dough was rolled into a sheet which was cut into strips. The strips were steamed at 95°C for a little over 2 minutes and then fried in lard at 130° – 140°C for 2 – 3 minutes.

The noodles so prepared readily swelled in hot water as do the usual "instant Chinese noddles" to become ready for eating. They had the pleasant taste and firm texture characteristic of the conventional product when of good quality, but a substantially reduced caloric value.

What is claimed is:

1. A food composition including at least 0.05% pullulan by weight, said pullulan being uniformly distributed in said composition and of a purity sufficient to have a bland taste and odor.

2. A composition as set forth in claim 1 which composition is in the frozen state.

3. A composition as set forth in claim 1, further including starch, the weight ratio of said pullulan to said starch being between 1:0.5 and 1:5.

4. A composition as set forth in claim 3, which is a baked food product.

5. A composition as set forth in claim 1 in the form of an edible aqueous liquid, at least 0.05 percent by weight of said pullulan being dissolved in said liquid.

* * * * *